US005827028A

United States Patent [19]
Swick

[11] Patent Number: 5,827,028

[45] Date of Patent: *Oct. 27, 1998

[54] ELECTRICAL CONNECTION TERMINAL ASSEMBLY AND TILT WASHER

[76] Inventor: E. Grant Swick, 28W629 Stearns Rd., Bartlett, Ill. 60103-6528

[ * ] Notice: The term of this patent shall not extend beyond the expiration date of Pat. No. 5,470,183.

[21] Appl. No.: 561,439

[22] Filed: Nov. 21, 1995

Related U.S. Application Data

[63] Continuation-in-part of Ser. No. 155,387, Nov. 22, 1993, Pat. No. 5,470,183.

[51] Int. Cl.[6] .............................. F16B 33/00; F16B 39/24; H01R 4/44; H01R 11/01

[52] U.S. Cl. .............................. 411/368; 411/160; 411/533; 411/959; 411/161; 439/782

[58] Field of Search .............................. 411/160, 161, 411/368, 533, 537, 957, 959; 439/246, 781, 782

[56] References Cited

U.S. PATENT DOCUMENTS

| | | | |
|---|---|---|---|
| 3,588,787 | 6/1971 | Kindell | 411/957 |
| 3,744,012 | 7/1973 | Gutshall | 439/782 |
| 4,269,464 | 5/1981 | Veldman | 439/782 |
| 5,470,183 | 11/1995 | Swick | 411/368 |
| 5,658,108 | 8/1997 | Swick | 411/368 |

*Primary Examiner*—Kenneth J. Dorner
*Assistant Examiner*—Robert G. Santos
*Attorney, Agent, or Firm*—James E. Brunton

[57] ABSTRACT

An electrical terminal clamping assembly of the character that will simultaneously accommodate and securely grip one or more conductor wires of substantially different diameters. The assembly includes a threaded terminal screw and a uniquely configured generally circular shaped clamping plate or tilt washer which is adapted to freely tilt relative to the undersurface of the head of the terminal screw in a manner to move gripping projections provided on the undersurface of the washer into secure clamping engagement with a wire of large diameter disposed on one side of the axial center line of the terminal screw and into secure clamping engagement with a wire of much smaller diameter disposed on the opposite side of the axial center line. The undersurface of the tilt washer is provided with several different types of uniquely configured gripping protuberances that provide multiple contact points for firmly gripping the different diameter conductor wires which are disposed on opposite sides of the terminal screw.

9 Claims, 7 Drawing Sheets

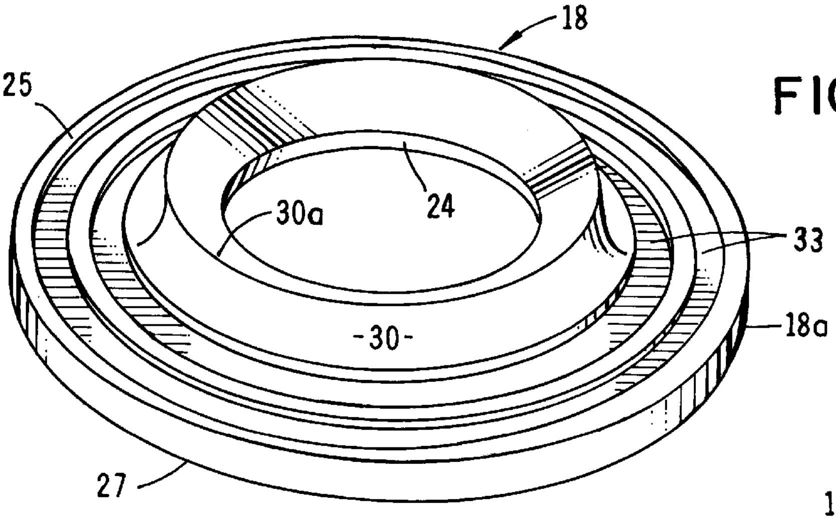
FIG. 1
FIG. 2
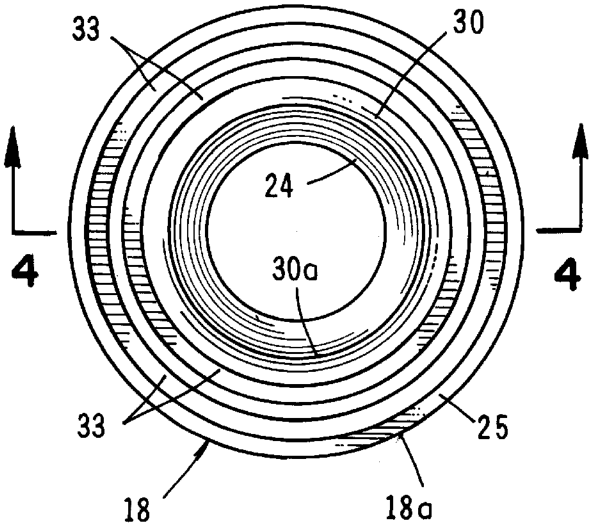
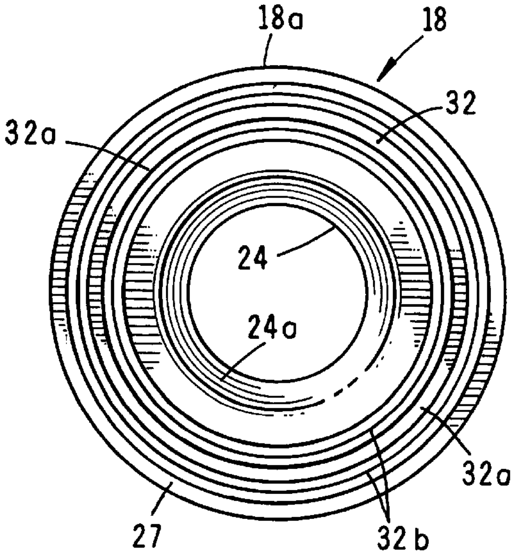
FIG. 3
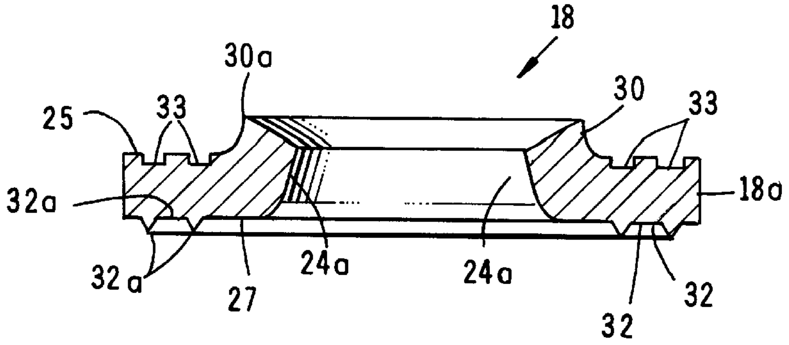
FIG. 4

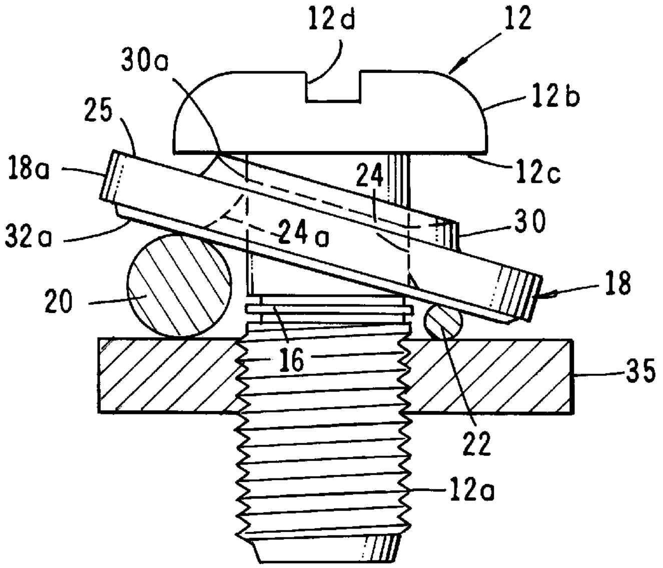
FIG. 5
FIG. 6
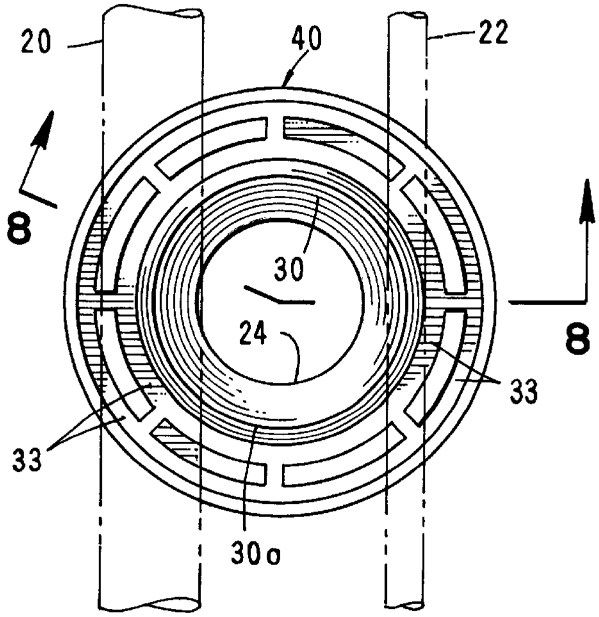
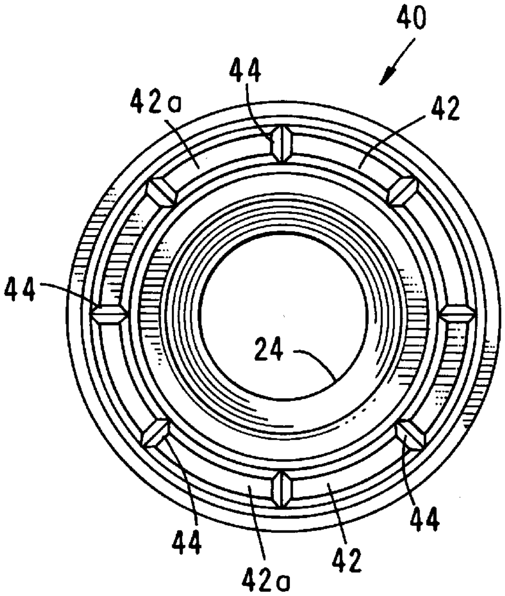
FIG. 7
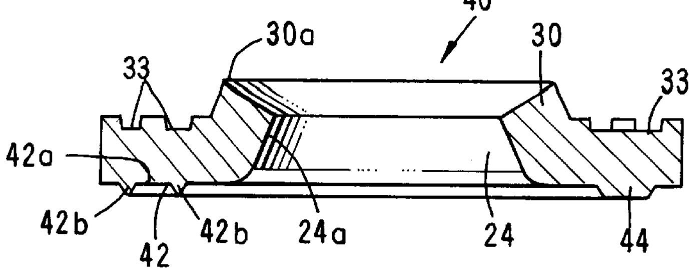
FIG. 8

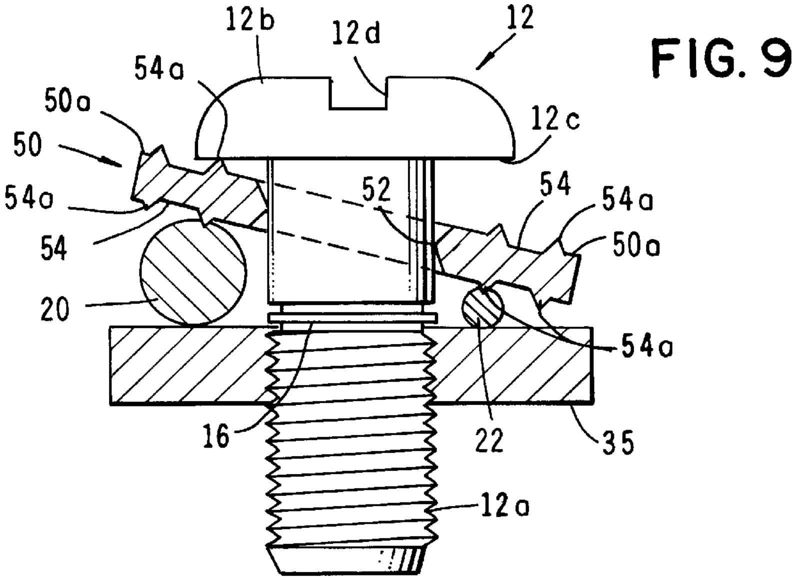
FIG. 9
FIG. 10
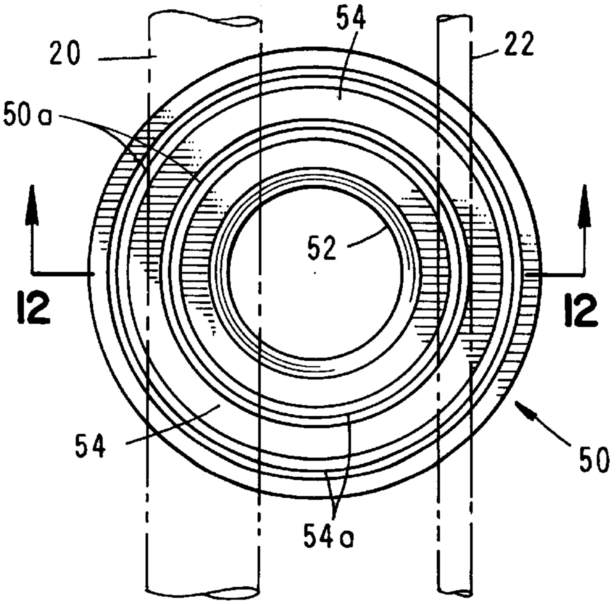
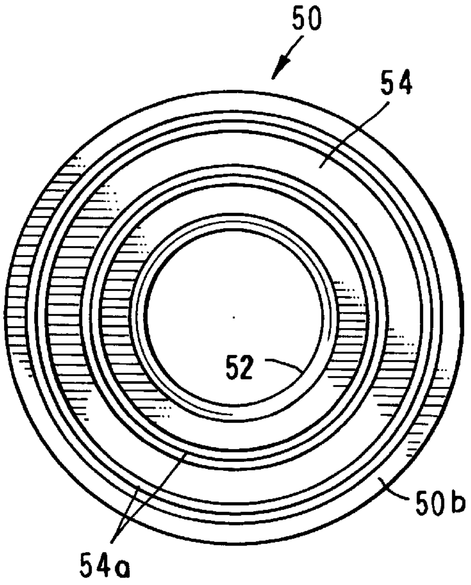
FIG. 11
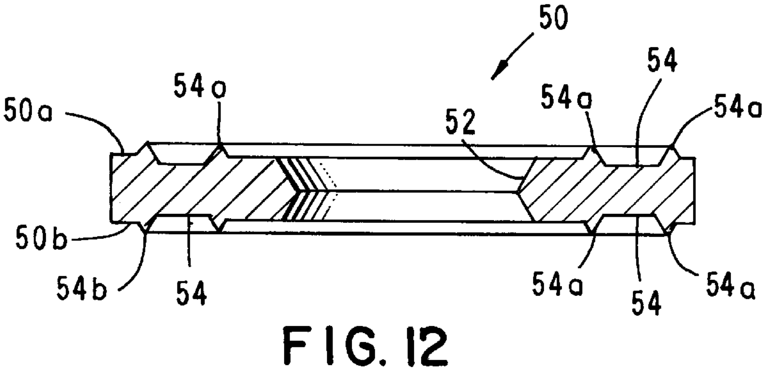
FIG. 12

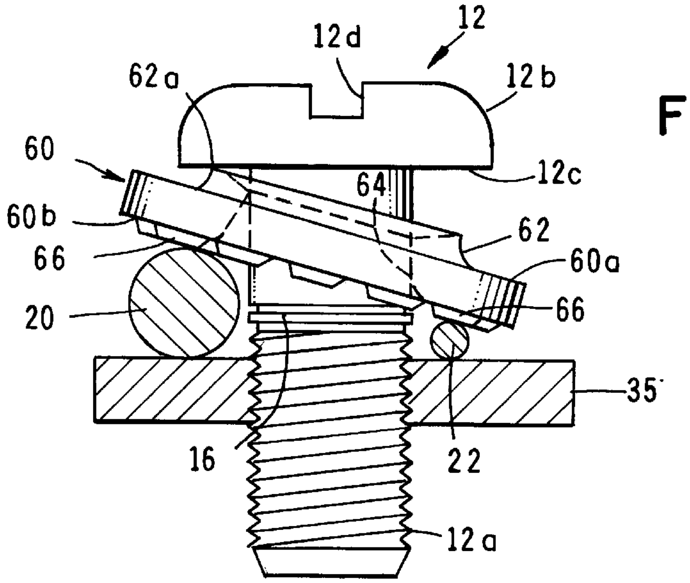
FIG. 13
FIG. 14
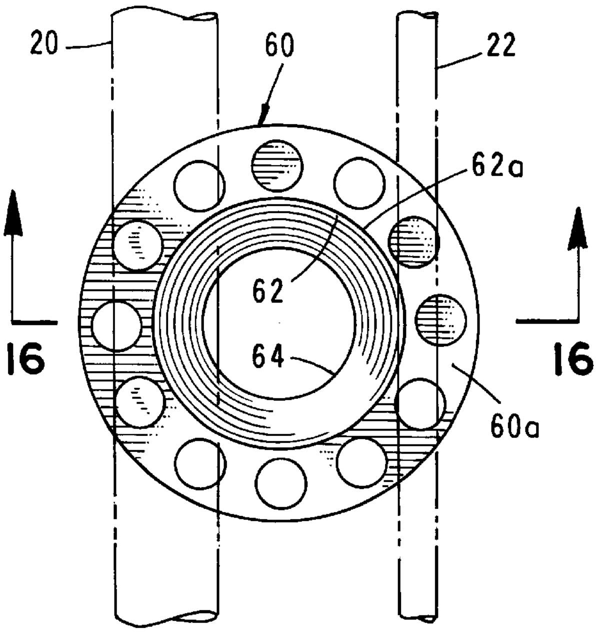
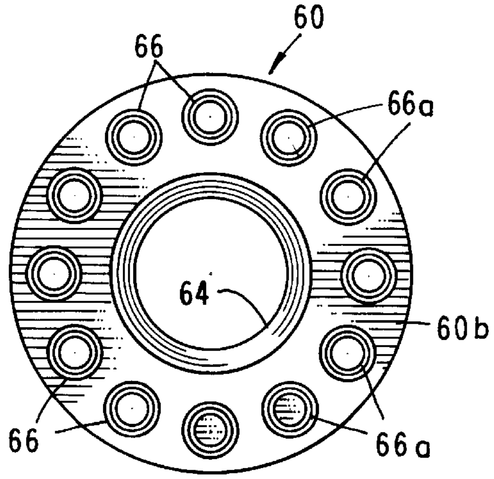
FIG. 15
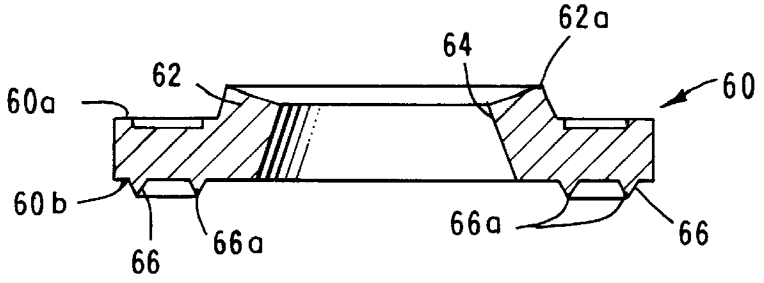
FIG. 16

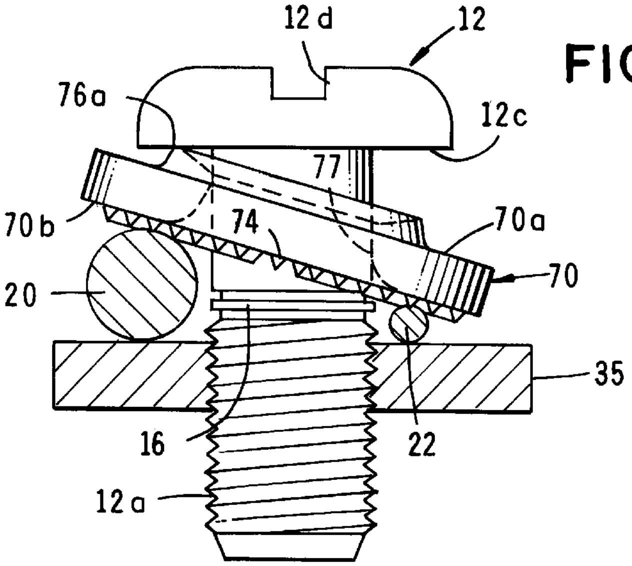
FIG. 17
FIG. 18
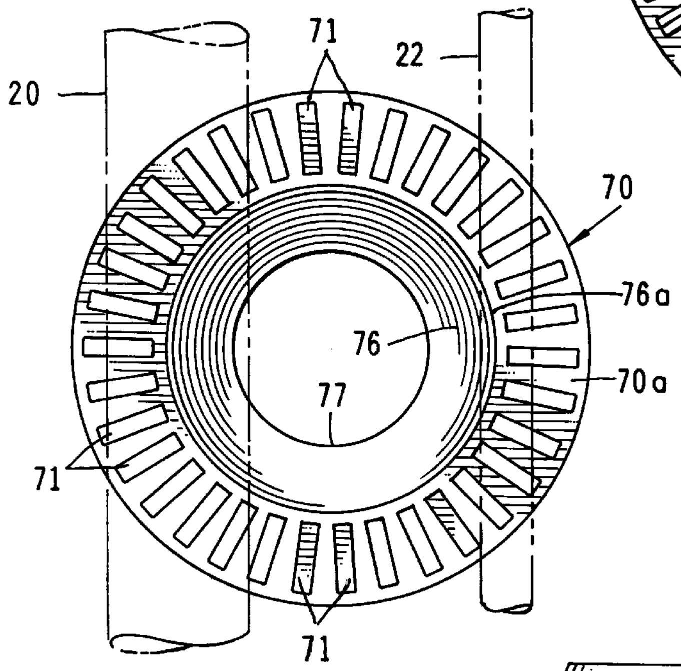
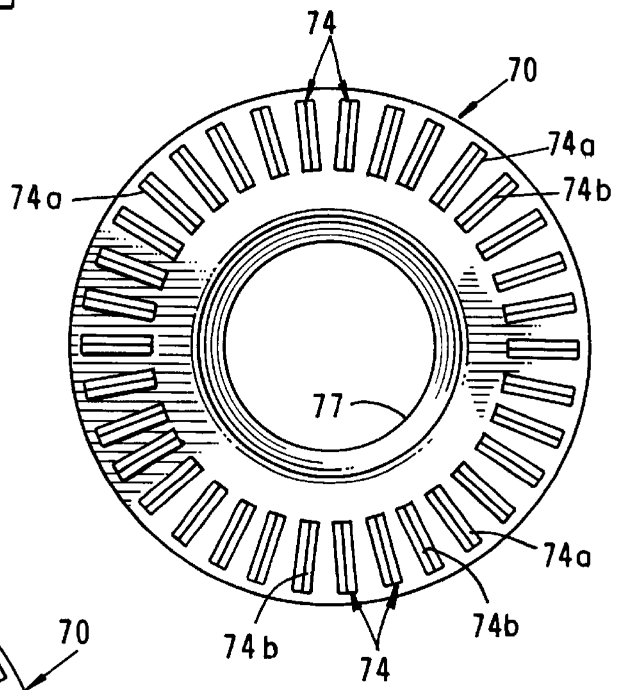
FIG. 19
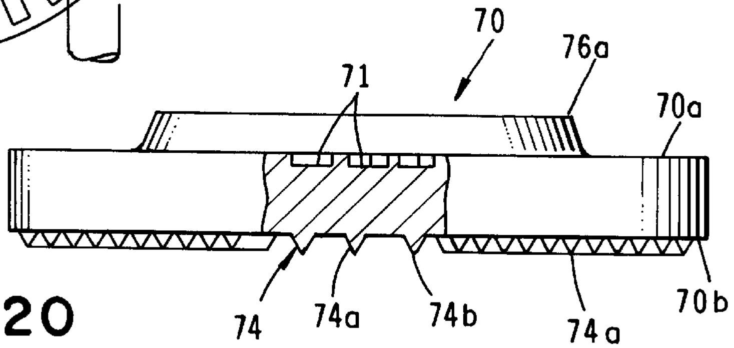
FIG. 20

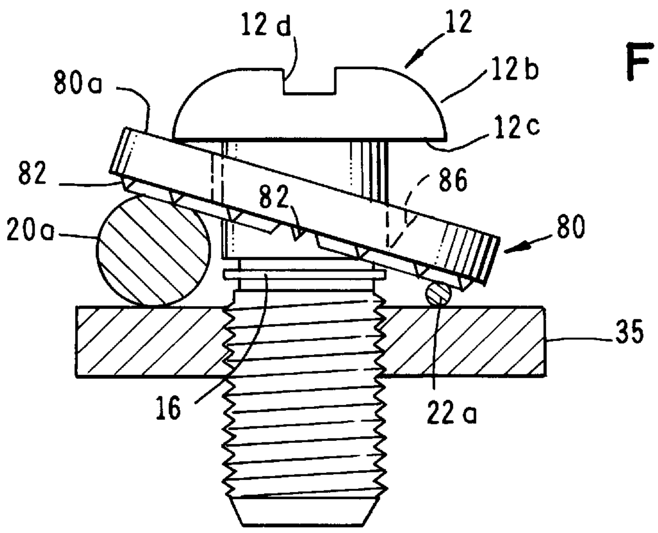
FIG. 21
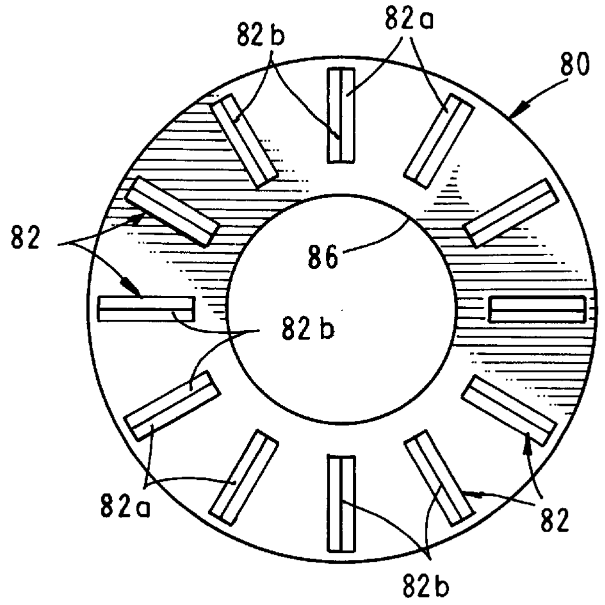
FIG. 23
FIG. 22
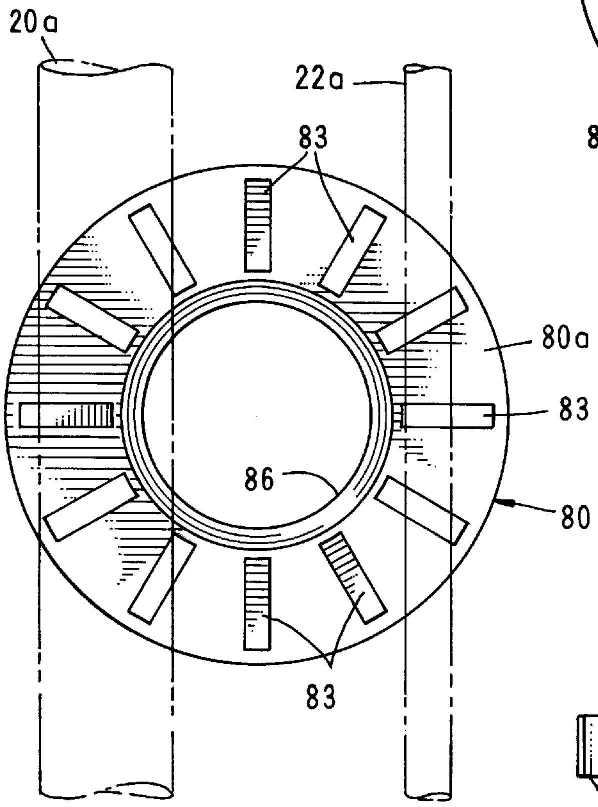
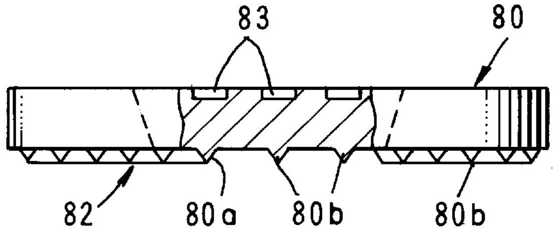
FIG. 24

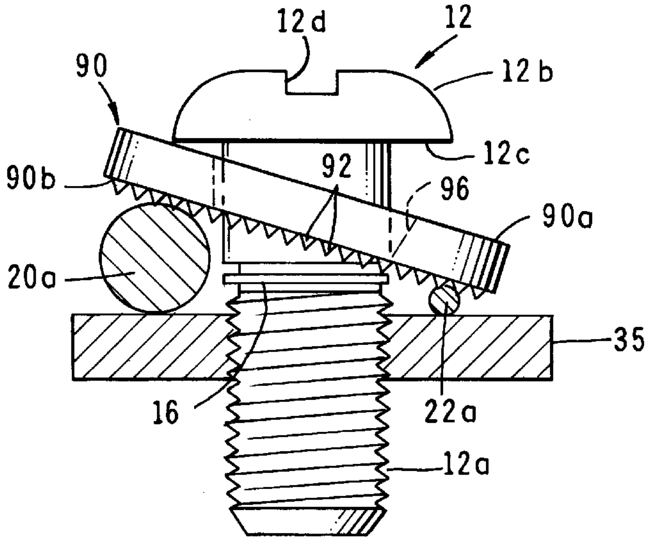
FIG. 25
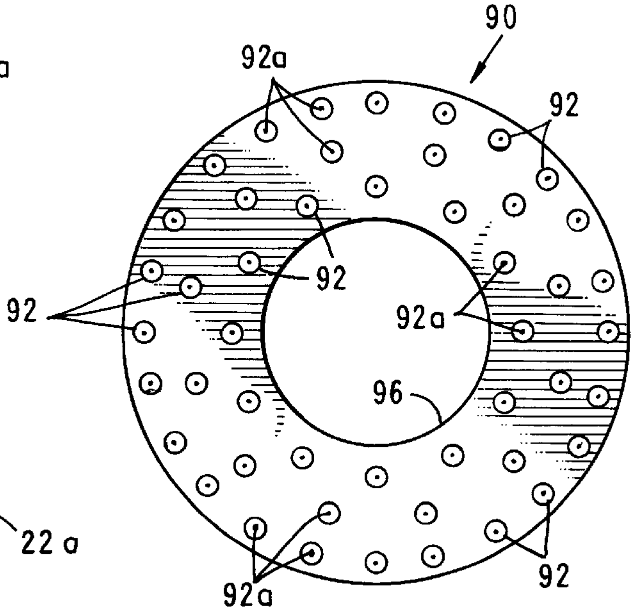
FIG. 27
FIG. 26
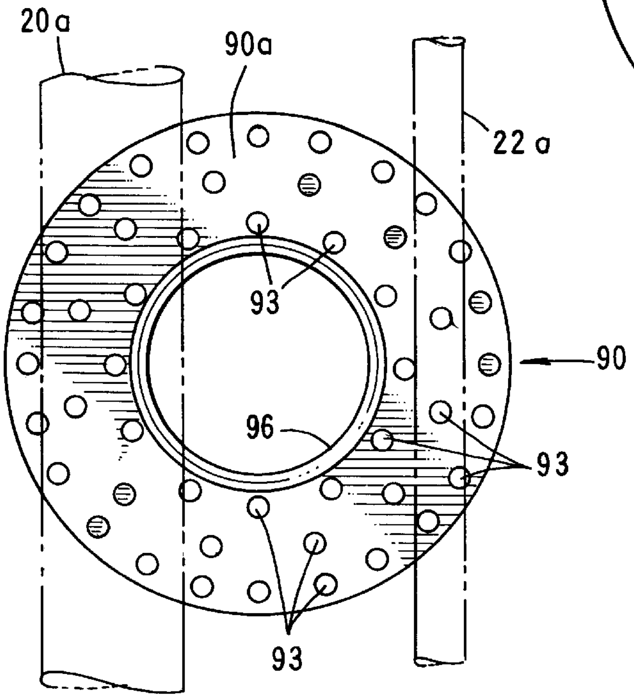
FIG. 28
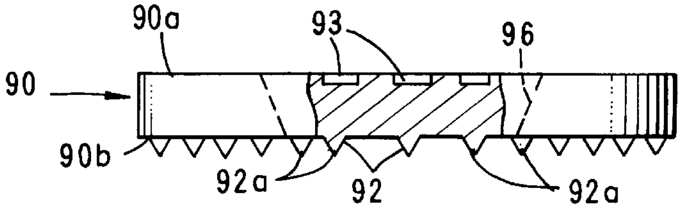

ELECTRICAL CONNECTION TERMINAL ASSEMBLY AND TILT WASHER

BACKGROUND OF THE INVENTION

This is a Continuation-In-Part application of Ser. No. 08/155,387 filed Nov. 22, 1993 now U.S. Pat. No. 5,470,183 and is related to a second Continuation-In-Part application of co-pending Ser. No. 08/155,387 filed on even date herewith.

FIELD OF THE INVENTION

The present invention relates generally to terminal clamp assemblies for clamping conductor wires of different sizes to a terminal block. More particularly, the invention concerns an electrical connection terminal assembly that includes a tilt or teetering washer of novel construction that tilts relative to the terminal screw proximate the axial center line thereof.

DISCUSSION OF THE INVENTION

A number of different types of terminal clamp assemblies have been suggested in the past. Typically, the prior art assemblies comprise a screw and a clamping plate which is loosely mounted on the screw shank for tilting or teetering relative to the shank to accommodate wires of different sizes. Many of the prior art devices incorporate a rib structure at the undersurface of the washer to concentrate a clamping pressure on the conductor wires in an attempt to insure a positive and secure electrical contact.

In certain prior art devices, tiltability of the clamping plate or tilt washer has been achieved by providing a particularly designed clamping surface beneath the head of the screw. U.S. Pat. No. 3,744,012 issued to Gutshall is exemplary of this type of construction. Another prior art construction is described in U.S. Pat. No. 4,310,214 issued to Carlson, wherein a clamp plate or washer is provided with four angularly-spaced, raised embossments which project above the upper surface of the clamp plate for engagement with a circular protrusion formed on the undersurface of the head of the screw. In yet another prior device, which is described in U.S. Pat. No. 3,135,777 issued to Barth, the clamping member is provided with a tube like protuberance which terminates in an edge that engages the undersurface of the screw head and permits the washer to tilt about a location disposed proximate the shank of the terminal screw. Other, more complicated and elaborate terminal connector assemblies, are described in U.S. Pat. No. 3,470,526 issued to Joly and in U.S. Pat. No. 3,081,507 issued to Gribble.

The prior art terminal clamp assemblies typically suffer from one or more shortcomings. For example, some are unduly complex, are difficult to use and are expensive to manufacture. Others lack in reliability in that they do not positively grip wires of different sizes. In this regard most electrical terminal clamp assemblies are subject to Underwriters Laboratory requirements. One of these requirements provides that certain terminal clamp assemblies be capable of grasping a 14 gauge wire on one side of the screw and a 22 gauge wire on the other side of the screw. In order to meet this requirement, the washer must tip or tilt substantially relative to the screw so that both the large and small conductor wires are securely clamped. Because the tilt washers in the prior art devices typically pivot about points located closely adjacent the edge of the shank of the screw and closely adjacent the center of the larger wire, the washer often cannot be effectively forced into secure clamping engagement with the small wires.

The device of the present invention uniquely and elegantly solves most of the problems inherent in the prior art devices by designing the tilt washer in a manner so that it freely tips relative to the undersurface of the screw head at locations proximate the axial center line of the screw. This novel construction enables the washer to tilt in a manner to effectively grip both the large and small diameter wires which are disposed on either side of the axial center line. To enhance the gripping abilities of the washer, the undersurface thereof is provided with uniquely configured and arranged gripping projections which positively and securely grip both the large and small diameter wires.

In both the parent of this application and in the related Continuation-In-Part application which was filed on even date with this application, the tilt washer or clamping plate was generally rectangular in shape and the terminal block included means for preventing rotation of the washer as the screw is rotated. This means was shown in the form of a plastic housing which surrounds the assemblage comprising the connecting screw and the tilt washer. The plastic housing included upstanding walls which engage the edge of the rectangular washer to prevent it from rotating during the tightening of the screw. As pointed out in the parent application, the rotation preventing means can take several forms so long as the generally rectangular washer was blocked from rotating about the shank of the screw.

The tilt washer of the form of the invention shown in the drawings of the present application is similar in many respects to that shown and described in the parent application. Accordingly, the parent application, Ser. No. 08/155, 387, filed Nov. 22, 1993 is hereby incorporated herein by reference as though fully set forth herein.

As will be discussed in detail hereinafter, the embodiment of the present invention uniquely comprises a tilt washer which, unlike that shown in the parent includes a body portion that is non-rectangular in shape. The novel tilt washer of this latest form of the invention need not be oriented relative to the terminal block as is the case with most of the rectangularly shaped tilt washers described in the parent application.

In using the generally rectangular shaped tilt washers of the character described in the parent application, it has been determined that, because of the novel design of certain of the wire gripping means of these devices, the tilt washer does not exhibit any tendency to rotate relative to the electrical wires after the gripping means has been brought into gripping engagement with the wires. Apparently the rather small contact area with the wires coupled with the clamping force exerted on the washer by tightening the screw imposes a relatively high pressure on the wire in the contact area thereby insuring a positive biting engagement with the comparatively soft electrical wires. This biting engagement is sufficient to prevent sliding, rolling or rotation of the wires relative to the tilt washer and relative to the terminal block as the connector screw is tightened. This being the case, the present inventor has concluded that in some instances the tilt washers can advantageously be made circular rather than rectangular thereby eliminating any need to orient the washer relative to the terminal block.

SUMMARY OF THE INVENTION

It is an object of the present invention to provide a terminal clamping assembly of the character that will simultaneously accommodate and securely grip one or more conductor wires of substantially different diameters.

More particularly, it is an object of the invention to provide an assembly of the aforementioned character which includes a uniquely configured clamping plate or tilt washer which is adapted to tilt freely relative to the undersurface of the screw head proximate the axial center line of the screw so as to move gripping projections provided on the undersurface of the washer into secure clamping engagement with a wire of large diameter disposed on one side of the axial center line of the screw and into positive clamping engagement with a wire of much smaller diameter disposed on the opposite side of the axial center line.

Another object of the invention is to provide an assembly as described in the preceding paragraphs in which the undersurface of the tilt washer is provided with uniquely configured gripping protuberances of various types that provide multiple contact points for firmly gripping the different diameter conductor wires which are disposed on opposite sides of the terminal screw.

Another object of the invention is to provide a terminal connector assembly which is of a simple, straight-forward design and one that can be easily and inexpensively manufactured in large volume.

Another object of the invention is to provide a device of the class described which is generally circular in shape and need not be oriented relative to the terminal block.

Another object of the invention is to provide a device of the character described in the preceding paragraph which includes non-rectangular shaped tilt washers having novel wire gripping elements which, when urged into pressure contact with the electrical wires, holds the tilt washer in place and resist rotation of the washer relative to the wires and the terminal block as the screw is tightened.

Another object of the invention is to provide a tilt washer as described in the preceding paragraphs which is easy and inexpensive to manufacture in very large quantities and requires no means on the terminal block to prevent washer rotation thereby further simplifying the construction of the terminal block with which the washer is used.

DESCRIPTION OF THE DRAWINGS

FIG. 1 is a generally perspective view illustrating one form of the tilt washer of the invention for use with a connector assembly construction of the character shown in FIG. 5.

FIG. 2 is a top plan view of the tilt washer of FIG. 1.

FIG. 3 is a bottom plan view of the washer of FIG. 1.

FIG. 4 is a cross-sectional view taken along lines 4—4 of FIG. 2.

FIG. 5 is a cross-sectional view of one form of connector assembly of the invention showing the tilt washer of FIG. 1 in position thin the connector assembly.

FIG. 6 is a top plan view of an alternate form of tilt washer of the invention.

FIG. 7 is a bottom plan view of the washer of FIG. 6.

FIG. 8 is a cross-sectional view taken along lines 8—8 of FIG. 6.

FIG. 9 is a side-elevational, cross-sectional view of yet another embodiment of the connector assembly of the invention.

FIG. 10 is a top plan view of the washer portion of the connector assembly shown in FIG. 9.

FIG. 11 is a bottom plan view of the washer portion of the connector assembly shown in FIG. 9.

FIG. 12 is a cross-sectional view taken along lines 12—12 of FIG. 10.

FIG. 13 is a side-elevational, partial cross-sectional view illustrating still another form of the connector assembly construction of the invention.

FIG. 14 is a top plan view of the washer portion of the connector assembly shown in FIG. 13.

FIG. 15 is a bottom plan view of the washer portion of the connect or assembly shown in FIG. 13.

FIG. 16 is a cross-sectional view taken along lines 16—16 of FIG. 14.

FIG. 17 is a side-elevational, partial cross-sectional view illustrating another form of the connector assembly construction of the invention.

FIG. 18 is a top plan view of the washer portion of the connector assembly shown in FIG. 17.

FIG. 19 is a bottom plan view of the washer portion of the connector assembly shown in FIG. 17.

FIG. 20 is a side view of the washer partially in section.

FIG. 21 is a side-elevational, partial cross-sectional view illustrating still another form of the connector assembly construction of the invention.

FIG. 22 is a top plan view of the washer portion of the connector assembly shown in FIG. 21.

FIG. 23 is a bottom plan view of the washer portion of the construction shown in FIG. 21.

FIG. 24 is a side view of the washer partially in cross-section.

FIG. 25 is a side-elevational, partial cross-sectional view illustrating yet another form of the connector assembly construction of the invention.

FIG. 26 is a top plan view of the washer portion of the assembly shown in FIG. 25.

FIG. 27 is a bottom plan view partly of the washer portion of the construction shown in FIG. 25.

FIG. 28 is a cross-sectional view taken along lines 28—28 of FIG. 26.

DESCRIPTION OF THE INVENTION

Referring to the drawings and particularly to FIGS. 1 through 5, one form of the tilt washer and electrical connector assembly of the present invention is there illustrated. This form of the invention is similar in many respects to that described in the parent application, Ser. No. 08/155,387, which is incorporated herein by reference. However, the tilt washer of the present invention is non-rectangular in plan rather than being rectangular and includes gripping means of a somewhat different orientation than those provided on the generally rec-tangular shaped tilt washers.

As before, the embodiment of the invention depicted in FIGS. 1 through 5 includes a threaded member or screw 12 of the general configuration shown in FIG. 5 having a threaded shanks portion 12*a* and a head portion 12*b*. Head portion 12*b* has a generally flat, annular-shaped undersurface 12*c* and is provided with a tool-engaging slot 12*d*. Slot 12*d* can be a standard screw driver slot, a "Phillips" slot, a combination thereof or any other suitable driving means receptacle. An annular-shaped collar 16, the purpose of which will presently be described, is formed on shank 12*a* at a location above the threaded portion thereof.

Disposed between collar 16 and undersurface 12*c* of the head portion is the previously mentioned wire clamping means shown here as a clamping plate or tilt washer 18 which is adapted to securely clamp electrical conductors or wires of the same or differing diameters. In FIG. 5, the conductors are shown as a large diameter, solid wire conductor 20 and a small diameter, solid wire conductor 22.

As best seen by referring to FIG. 2, washer 18 includes a body portion 18*a* provided with a centrally disposed aperture 24. As shown in FIG. 4, aperture 24 is provided with a sloping side wall 24*a* that interconnects the upper and lower surfaces of the washer designated in FIG. 4 by the numerals 25 and 27 respectively.

It can be seen that upper surface 25 of the tilt washer is provided with screw head engaging means which here comprises an upstanding, collar like protuberance 30 which is concentric with an aperture 24 formed at the center of the washer. Protuberance 30 is generally annular shaped and terminates in an upper, circular rim 30*a* (FIG. 5) which is adapted to engage undersurface 12*c* of the screw head as the washer tilts in the manner shown in FIG. 5.

Provided on the lower surface 27 of the gripping plate, or washer body 18*a*, is the previously mentioned gripping means for positively gripping the wire conductors 20 and 22. In the present form of the invention, the gripping means comprises a generally circular shaped channel 32 having a bottom wall 32*a* and spaced apart, generally circular shaped side walls or upstanding gripping ridge 32*b*. As best seen in FIG. 4, each of the gripping ridges 32*b* circumscribes aperture 24 and terminates in a relatively sharp edge which is adapted to bite into and securely grip the wire conductor with which it is forced into contact. Channel 32 and gripping ridges 32*b* can be formed by various methods well known to those skilled in the art but are preferably formed by a coining process of the character described in greater detail in Ser. No. 08/155,387. When channel 32 and ridges 32*b* are formed by a coining process, corresponding channels 33 are formed on upper surface 25 (see FIG. 4).

With the construction thus described, prior to tightening the screw to the terminal 35 (FIG. 5), the conductor wires 20 and 22 are inserted between the terminal and the washer in the manner shown in FIG. 5 so that the wires are disposed beneath the gripping ridges 32*b*. As the screw is tightened relative to the terminal, the screw head engaging means, or collar 30, move into engagement with the undersurface 12*c* of the screw head and portions of the gripping means move into engagement with the larger diameter electrical conductor 20. Continued tightening of the screw will cause the washer to tilt within aperture 24 and pivot relative to undersurface 12*c* of the screw head in the manner shown in FIG. 5. As the washer tilts, second portions of the gripping protuberances will move into gripping engagement with the smaller diameter electrical conductor 22. A continued tightening of the screw will then cause portions of ridges 32*b* to bite into and securely grip both the larger diameter and smaller diameter electrical conductors. As previously discussed, the terminal block need not include means for preventing rotation of the washer as the screw is rotated since rotation of the washer is prevented by the gripping ridges 32*b* biting into the relatively soft wires. Stated another way, the limited contact are between the tilt washer and the wires coupled with the relatively high contact pressure generated by screw 12 tends to positively resist rotation of the wire. More particularly, since the electrical wires are softer than the washer, the screw insures good penetration of ridges 32*b* and hence more frictional interference to relative motion between the wire and the washer. Further, because the harder screw and washer also have limited contact area and a greater hardness, the screw head will slide on the washer and not encourage the washer to slide or rotate relative to the wire. These factors make the washer construction shown in FIGS. 1 through 5 extremely commercially attractive.

Turning next to FIGS. 6 through 8 another form of the tilt washer of the present invention is there illustrated. This form of the invention is very similar to that shown in FIGS. 1 through 5, save that the tilt washer 40 is here provided with gripping means of a slightly different configuration. Because of the similar nature of this latest form of the invention to that form previously described, like numbers are used to identify like components. In this latest form of the invention, the gripping means comprises a generally circular shaped channel 42 having a bottom wall 42*a* and spaced apart, generally circular shaped side walls or ridges 42*b*. As best seen in FIG. 8, each of the gripping ridges 42*b* circumscribes central aperture 24 and terminates in a relatively sharp edge which is adapted to bite into and securely grip the wire conductor with which it is forced into contact. As before ridges 42*b* can be formed by various methods well known to those skilled in the art. Also comprising apart of the gripping means of this latest form of the invention are a plurality of circumferentially spaced radial protuberances 44 which extend between ridges 42*b*. Protuberance 44 also bite into the electrical wires and further resist rotation of the washer relative to the wires.

As before, the upper surface of the tilt washer 40 is provided with screw head engaging means of a configuration similar to that shown in FIGS. 1 and 5. More particularly, in this latest embodiment of the invention, the screw head engaging means comprises an upstanding collar like protuberance 30 which is concentric with an aperture 24 formed at the center of the washer. Protuberance 30 terminates in an upper, circular rim 30*a* which is adapted to engage undersurface 12*c* of the screw head as the washer tilts in the manner shown in FIG. 5.

Referring to FIGS. 9 through 12, still another form of the electrical connector assembly of the present invention is there illustrated. This form of the invention is also similar to that shown in FIGS. 1 through 5, save that the annular collar 30 is absent from tilt washer 50 of this latest form of the invention and the upper surface, as well as the lower surface, is uniquely provided with gripping means of a generally circular configuration. Because of the similar nature of this latest form of the invention to those forms previously described, like numbers are used to identify like components. The washer 50 of this latest form of the invention is unique in that it is "unsided". That is, as will presently be described, either side of the washer can be disposed proximate the undersurface of the screw head.

As best seen in FIGS. 9 and 12, washer 50 is provided with a central aperture 52 to receive the screw 12 and includes first and second surfaces 50*a* and 50*b*, each of which is provided with generally circular channels 54 which comprise the gripping means of this latest form of the invention. As before, channels 54 include gripping ridges 54*a* which circumscribe aperture 52 and are formed in the same manner and function in the same way as those previously described in connection with the embodiment of the invention shown in FIGS. 1 through 5.

Referring to FIG. 9, it is to be observed that here the screw head engaging means of this latest form of the invention uniquely comprises one of the ridges 54*a* of the channel 54 that is formed on the upper or first surface 52*a* of the washer. As the washer tilts in the manner shown in FIG. 9, the innermost ridge area 54*a* of the ridges formed on the upper surface of the washer will move into engagement with the under surface 12*c* of the washer.

With the construction illustrated in FIGS. 9 through 12, prior to tightening the screw to the terminal block, the conductor wires are once again inserted between the terminal and the properly oriented washer in the manner previously described so that the gripping protuberances span the wires. Advantageously, either side 50a or 50b of the washer can be placed adjacent the undersurface 12c of the screw head and the washer need not be specifically oriented relative to the terminal block. As the screw is tightened relative to the terminal block, the screw head engaging means, or, in this case, the innermost ridge 54a of the washer will move into engagement with the undersurface of the screw head and one pair of gripping means move into engagement with the larger diameter electrical conductor. Continued tightening of the screw will cause the washer to tilt or pivot relative to the screw head so that the second pair of gripping protuberances move into gripping engagement with the smaller diameter electrical conductor (FIG. 9). A continued tightening of the screw will then cause portions of ridges 54a to bite into and securely grip both the larger and smaller diameter conductors.

Referring to FIGS. 13 through 16, another form of the electrical connector assembly of the present invention is there illustrated. This form of the invention is also similar in many respects to that shown in FIGS. 1 through 5, save that the tilt washer includes gripping means of still a different configuration. As before, this embodiment of the invention includes a threaded member or screw 12 having the same general configuration previously described. Turning particularly to FIGS. 13 and 16, it can be seen that upper surface 60a of the tilt washer 60 is provided with screw head engaging means of a configuration similar to that shown in FIGS. 1 through 5 and like numbers are used in FIGS. 13 through 16 to identify like elements. In this latest embodiment of the invention the screw head engaging means comprises an upstanding collar like protuberance 62 which is concentric with an aperture 64 formed at the center of the washer. As before, protuberance 62 is generally annular shaped and terminates in an upper, circular rim 62a (FIG. 16) which is adapted to engage undersurface 12c of the screw head as the washer tilts in the manner shown in FIG. 13.

Provided on the lower surface 60b of the gripping plate, or washer body 60, are gripping means for positively gripping the wire conductors 20 and 22. In this latest form of the invention, the gripping means comprise a plurality of circumferentially spaced-apart, generally circular-shape gripping protuberances 66, which surrounds the central aperture with each protuberance being provided with a generally circular shaped, upstanding gripping ridge 66a. As best seen in FIG. 15, each of the gripping ridges 66a terminates in a relatively sharp edge which is adapted to bite into and securely grip the wire conductor with which it is forced into contact. Ridges 66a can be formed by various methods well known to those skilled in the art but, as before, are preferably formed by a coining process of the character previously described.

As before, washer 60 is held captive between annular collar 16 and the undersurface 12c of the screw head 12b and because of the sloping side wall of aperture 64, and collar 62 is free to tilt relative to the screw shank.

Turning next to FIGS. 17 through 20, still another form of the electrical connector assembly of the present invention is there illustrated. This form of the invention is very similar to that shown in FIGS. 13 through 16, save that the tilt washer 70 is provided with gripping means of still another configurations. Because of the similar nature of this latest form of the invention to those forms previously described, like numbers are once again used to identify like components. In this latest form of the invention, the gripping means comprise a multiplicity of circumferentially, spaced-apart, generally radially extending teeth-like gripping protuberances 74, each of which is provided with an upstanding gripping ridge 74a. As best seen in FIG. 20, each of the gripping ridges 74a terminates in a relatively sharp edge 74b which is adapted to bite into and securely grip the wire conductor with which it is forced into contact (FIG. 17). Ridges 74a surround the central aperture and are substantially disposed in a single plane which is generally parallel to the lower surface of the washer. Protuberances 74 can be formed by various methods well known to those skilled in the art, such as by coining and like process. When ridges 74a are formed by a coining process, circumferentially spaced cavities 71 are formed in the upper surface 70a of the washer (FIG. 18).

As before, the upper surface 70a of the tilt washer 70 is provided with screw head engaging means of a configuration similar to that shown in FIG. 13. More particularly, in this latest embodiment of the invention, the screw head engaging means comprises an upstanding collar like protuberance 76a which is concentric with an aperture 77 formed at the center of the washer. Protuberance 76 terminates in an upper, circular rim 76c which is adapted to engage undersurface 12c of the screw head as the washer tilts in the manner shown in FIG. 17.

Referring to FIGS. 21 through 24, another form of the electrical connector assembly of the present invention is there illustrated. This form of the invention is similar to that shown in FIGS. 17 through 20, save that the tilt washer 80 has a generally planar upper surface and is provided with gripping means of still a different configuration. Because of the similar nature of this latest form of the invention to those forms previously described, like numbers are used to identify like components. In this latest form of the invention, the gripping means comprise a plurality of circumferentially spaced-apart, generally radially extending teeth-like gripping protuberances 82, which are similar to protuberances 74, but are somewhat larger and are spaced apart by greater distances. As before, each protuberance includes an upstanding gripping ridge 82a which is disposed within a plane generally parallel to the lower surface of the washer. As best seen in FIG. 24, each of the gripping ridges 82a terminates in a relatively sharp edge 82b which is adapted to bite into and securely grip the wire conductor with which it is forced into contact. Ridges 82a can be formed by various methods well known to those skilled in the art. When the ridges 82a are formed by coining circumferentially spaced cavities 83 are formed in upper surface 80a (FIG. 22). In the embodiment of the invention shown in this latest group of drawings, wire 20a is slightly larger in diameter than wire 20 and wire 22 is slightly smaller in diameter than wire 22, but the device operates in the same manner as does the previously described connector assemblies.

In the embodiment shown in FIG. 21, the generally planar upper surface 80a of the tilt washer 21 itself comprises the screw head engaging means of the invention. More particularly, in this latest embodiment of the invention, the washer 80 is provided with a central aperture 86 which is configured to permit the washer to tilt so that upper surface of the washer engage undersurface 12c of the screw head in the manner shown in FIG. 21.

Referring finally to FIGS. 25 through 28, yet another form of the electrical connector assembly of the present invention is there illustrated. This form of the invention is similar to that shown in FIGS. 17 through 20 in that the tilt washer 90 has a planar upper surface 90a. However, the lower surface 90b of the washer is provided with gripping means of yet another configuration. Because of the similar nature of this latest form of the invention to those forms previously described, like numbers are used to identify like components. In this latest form of the invention, the gripping means comprise a multiplicity of circumferentially and radially spaced-apart, dimple-like gripping protuberances 92. As best seen in FIG. 27, each dimple-like protuberance terminates in a relatively sharp point 92a which is adapted to bite into and securely grip the wire conductor with which it is forced into contact. Dimples 92 can be formed by various methods well known to those skilled in the art. When the dimples are formed by coining, a multiplicity of small cavities 93 are formed in surface 90*a* (FIG. 26).

As was the case with the embodiment shown in FIG. 2, the generally planar upper surface 90*a* of the tilt washer itself comprises the screw head engaging means of the invention. More particularly, washer 90 is provided with a central aperture 96 which is configured to permit the washer to tilt so that upper surface of the washer will engage undersurface 12*c* of the screw head in the manner shown in FIG. 25.

In each of the various embodiments of the invention shown in the drawings, the gripping means, or wire engaging protuberances can be formed in various ways. As previously mentioned, coining processes are preferred for forming the gripping means but any number of other processes, such as various punch and die processes can be used.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the, scope and spirit of the invention, as set forth in the following claims.

I claim:

1. A connector assembly to which electrical wires can be detachably connected comprising:

(a) a threaded member having a shank portion and a head portion, said shank portion having a longitudinal axis and said head portion having a generally flat undersurface;

(b) a clamping plate including a non-rectangular shaped body portion having first and second spaced apart surfaces and a centrally disposed aperture for receiving said shank portion of said threaded member, said body portion being pivotable generally about the longitudinal axis of said shank portion of said threaded member;

(c) screw head engaging means provided on at least one of said first and second surfaces of said clamping plate for engaging the undersurface of said head portion of said threaded member said screw head engaging means comprising a generally annular shaped protuberance which is substantially angular in cross section and terminates in a screw head engaging apex for engaging said undersurface of said head portion of said threaded member as said clamping plate tilts; and (d) gripping means provided on at least one of said first and second surfaces of said clamping plate for gripping a wire placed proximate said clamping plate said gripping means comprising a gripping protuberance having a wire engaging ridge comprising a generally circular shaped, upstanding gripping ridge which terminates in a sharp, wire engaging edge.

2. A connector assembly as defined in claim 1 in which said gripping means comprise a plurality of generally circular shaped protuberances surrounding said aperture each having a generally circular shaped, upstanding, share wire gripping edge.

3. A connector assembly as defined in claim 1 in which said first and second spaced-apart surfaces are substantially parallel.

4. A connector assembly to which electrical wires can be detachably connected comprising:

(a) a threaded member having a shank portion and a head portion, said shank portion having a longitudinal axis and said head portion having a generally flat undersurface;

(b) a generally circular shaped clamping plate having first and second spaced apart surfaces and a centrally disposed aperture for receiving said shank portion of said threaded member;

(c) screw head engaging means provided on at least one of said first and second surfaces of said clamping plate for engaging the undersurface of said head portion of said threaded member, said screw head engaging means comprising an upstanding, generally annular-shaped protuberance which terminates in an upper generally circular-shaped screw head engaging rim for engaging said undersurface of said head portion of said threaded member as said clamping plate tilts; and (d) gripping means provided on at least one of said first and second surfaces of said clamping plate for gripping a wire placed proximate said clamping plate, said gripping means comprising a generally circular-shaped wire gripping ridge terminating in a sharp wire engaging edge.

5. A connector assembly as defined in claim 4 in which said gripping means comprise a plurality of generally circular shaped protuberances each terminating in a generally circular shaped wire engaging ridge.

6. A connector assembly as defined in claim 4 in which said screw-head engaging means comprises a portion of at least one of said first and second surfaces.

7. A connector assembly to which electrical wires can be detachably connected comprising:

(a) a threaded member having a shank portion and a head portion, said shank portion having a longitudinal axis and said head portion having a generally flat undersurface;

(b) a clamping plate including a non-rectangular shaped body portion having first and second spaced apart surfaces and a centrally disposed aperture for receiving said shank portion of said threaded member, said body portion being pivotable generally about the longitudinal axis of said shank portion of said threaded member;

(c) screw head engaging means provided on at least one of said first and second surfaces of said clamping plate for engaging the undersurface of said head portion of said threaded member, said screw head engaging means comprising an upstanding, generally annular-shaped protuberance which terminates in an upper, generally circular-shaped screw head engaging rim which is generally annular in cross section for engagement with said undersurface of said head portion of said threaded member as said clamping plate tilts; and (d) gripping means provided on at least one of said first and second surfaces of said clamping plate for gripping a wire placed proximate said clamping plate, said gripping means comprising a generally circular-shaped wire gripping ridge terminating in a sharp, wire engaging edge.

8. A connector assembly as defined in claim 7 in which said gripping means comprises a plurality of generally circular-shaped, wire-engaging ridges circumscribing said centrally disposed aperture.

9. A connector assembly as defined in claim 7 in which said wire-engaging ridges are substantially coplanar.

* * * * *